US006775378B1

(12) United States Patent
Villena et al.

(10) Patent No.: US 6,775,378 B1
(45) Date of Patent: Aug. 10, 2004

(54) BLENDED AGENT CONTACT CENTER

(75) Inventors: Jose Villena, Miami, FL (US); Alex Tellez, Miami, FL (US); Madhu Mathur, Miami, FL (US); Jeffrey Stout, Miami, FL (US); Eyal Ben-Chanoch, Miami, FL (US)

(73) Assignee: Concerto Software, Inc, Westford, MA (US)

( * ) Notice: Subject to any disclaimer, the term of this patent is extended or adjusted under 35 U.S.C. 154(b) by 0 days.

(21) Appl. No.: 09/426,677

(22) Filed: Oct. 25, 1999

(51) Int. Cl.[7] .............................................. H04M 3/00

(52) U.S. Cl. ........................ 379/266.07; 379/265.11; 379/265.12; 379/265.13

(58) Field of Search ....................... 379/266.07, 265.11, 379/265.12, 265.13

(56) References Cited

U.S. PATENT DOCUMENTS

| | | |
|---|---|---|
| 3,333,271 A | 7/1967 | Robinson et al. ........... 343/113 |
| 4,066,847 A | 1/1978 | Giordano |
| 4,286,118 A | 8/1981 | Mehaffey et al. |
| 4,356,348 A | 10/1982 | Smith |
| 4,392,129 A | 7/1983 | Mehaffey et al. ........... 340/765 |
| 4,408,100 A | 10/1983 | Pritz et al. |
| 4,477,698 A | 10/1984 | Szlam et al. |
| 4,494,229 A | 1/1985 | Jolissaint ..................... 370/58 |
| 4,510,351 A | 4/1985 | Costello et al. |
| 4,540,855 A | 9/1985 | Szlam et al. |
| 4,593,273 A | 6/1986 | Narcisse ..................... 340/539 |
| 4,599,493 A | 7/1986 | Cave |
| 4,600,814 A | 7/1986 | Cunniff et al. |
| 4,677,663 A | 6/1987 | Szlam ........................ 379/211 |
| 4,692,858 A | 9/1987 | Redford et al. ............. 364/200 |
| 4,694,483 A | 9/1987 | Cheung ....................... 379/34 |
| 4,720,853 A | 1/1988 | Szlam ........................ 379/211 |
| 4,742,537 A | 5/1988 | Jesurum ..................... 379/351 |
| 4,742,538 A | 5/1988 | Szlam ........................ 379/361 |
| 4,742,539 A | 5/1988 | Szlam ........................ 379/377 |
| 4,757,267 A | 7/1988 | Riskin ........................ 379/113 |
| 4,782,463 A | 11/1988 | Sanders ..................... 364/900 |
| 4,782,510 A | 11/1988 | Szlam ......................... 379/88 |
| 4,792,968 A | 12/1988 | Katz ........................... 379/92 |
| 4,797,911 A | 1/1989 | Szlam et al. ................. 379/67 |
| 4,811,240 A | 3/1989 | Ballou et al. ............... 364/518 |
| 4,829,563 A | 5/1989 | Crockett et al. ............ 379/309 |
| 4,858,120 A | 8/1989 | Samuelson .................. 364/401 |
| 4,866,638 A | 9/1989 | Cosentino et al. .......... 364/521 |
| 4,881,261 A | 11/1989 | Oliphant et al. ............ 379/215 |
| 4,894,857 A | 1/1990 | Szlam et al. ................. 379/67 |
| 4,896,345 A | 1/1990 | Thorne ....................... 379/67 |
| 4,933,964 A | 6/1990 | Girgis ......................... 379/67 |
| 4,939,771 A | 7/1990 | Brown et al. ................ 379/67 |

(List continued on next page.)

FOREIGN PATENT DOCUMENTS

EP 0855826 7/1998 ............ H04M/3/50

OTHER PUBLICATIONS

M2 Presswire, 3COM: Cell IT launches breakthrough multimedia call center solution based on high speed 3Com systems; Mar. 4, 1998; 1–3 webpages; Coventry.
AT & T Technology; In The Forefront With Integrated Call Centers; Winter 1992; 1–7 webpages; New York.
Telemarketing & Call Center Solutions; How a Travel–Industry Call Center Excels; Sep. 1997; 1–2 webpages; Norwalk.

*Primary Examiner*—Ahmad F. Matar
*Assistant Examiner*—Rasha Al-Aubaidi
(74) *Attorney, Agent, or Firm*—Bourque & Associates

(57) ABSTRACT

A blended contact center arrangement is disclosed wherein designated agent terminals may facilitate agent customer interaction with respect to a variety of different contact center applications. The agent terminals are logged on to both inbound and outbound contact center applications, and may switch between the two on a dynamic and flexible basis. Other types of agent customer interaction, such as email, webchat, etc. may be implemented as well.

5 Claims, 4 Drawing Sheets

U.S. PATENT DOCUMENTS

| | | | |
|---|---|---|---|
| 4,939,773 A | 7/1990 | Katz | 379/204 |
| 4,988,209 A | 1/1991 | Davidson et al. | 370/58 |
| 5,021,976 A | 6/1991 | Wexelblat et al. | 364/521 |
| 5,041,992 A | 8/1991 | Cunningham et al. | 364/518 |
| 5,062,103 A | 10/1991 | Davidson et al. | 370/58.1 |
| 5,070,525 A | 12/1991 | Szlam et al. | 379/196 |
| 5,115,501 A | 5/1992 | Kerr | 395/600 |
| 5,119,072 A | 6/1992 | Hemingway | 340/573 |
| 5,119,475 A | 6/1992 | Smith et al. | 395/156 |
| 5,121,477 A | 6/1992 | Koopmans et al. | 395/156 |
| 5,175,761 A | 12/1992 | Khalid et al. | 379/89 |
| 5,179,657 A | 1/1993 | Dykstal et al. | 395/161 |
| 5,179,700 A | 1/1993 | Aihara et al. | 395/650 |
| 5,181,236 A | 1/1993 | LaVallee et al. | 379/67 |
| 5,206,903 A | 4/1993 | Kohler et al. | 379/309 |
| 5,214,688 A | 5/1993 | Szlam et al. | 379/67 |
| 5,276,731 A | 1/1994 | Arbel et al. | 379/88 |
| 5,309,505 A | 5/1994 | Szlam et al. | 379/88 |
| 5,309,513 A | 5/1994 | Rose | 379/265 |
| 5,335,269 A | 8/1994 | Steinlicht | 379/266 |
| 5,345,589 A | 9/1994 | King et al. | 395/650 |
| 5,357,254 A | 10/1994 | Kah | 342/42 |
| 5,386,412 A | 1/1995 | Park et al. | 370/53 |
| 5,428,827 A | 6/1995 | Kasser | 455/161.3 |
| 5,430,792 A | 7/1995 | Jesurum et al. | 379/67 |
| 5,440,616 A | 8/1995 | Harrington et al. | 379/88 |
| 5,490,211 A | 2/1996 | Adams | 379/265 |
| 5,500,891 A | 3/1996 | Harrington et al. | 379/265 |
| 5,511,112 A | 4/1996 | Szlam | 379/88 |
| 5,511,117 A | 4/1996 | Zazzera | 379/265 |
| 5,519,773 A | 5/1996 | Dumas et al. | 379/265 |
| 5,533,109 A | 7/1996 | Baker | 379/201 |
| 5,535,270 A | 7/1996 | Doremus et al. | 379/266 |
| 5,546,456 A * | 8/1996 | Vilsoet et al. | 379/266.08 |
| 5,553,133 A | 9/1996 | Perkins | 379/265 |
| 5,568,544 A | 10/1996 | Keeler et al. | 379/273 |
| 5,579,368 A | 11/1996 | Berkum | 379/15 |
| 5,581,602 A | 12/1996 | Szlam | 379/67 |
| 5,586,178 A | 12/1996 | Koenig | 379/265 |
| 5,586,179 A * | 12/1996 | Stent et al. | 379/265.11 |
| 5,588,045 A | 12/1996 | Locke | 379/67 |
| 5,594,781 A | 1/1997 | Kozdon et al. | 379/60 |
| 5,594,791 A | 1/1997 | Szlam et al. | 379/265 |
| 5,619,557 A | 4/1997 | Berkum | 379/88 |
| 5,623,540 A | 4/1997 | Morrison et al. | 379/115 |
| 5,675,637 A | 10/1997 | Szlam et al. | 379/142 |
| 5,689,240 A | 11/1997 | Traxler | 340/573 |
| 5,696,818 A | 12/1997 | Doremus et al. | 379/265 |
| 5,714,932 A | 2/1998 | Castellon et al. | 340/539 |
| 5,715,307 A | 2/1998 | Zazzera | 379/265 |
| 5,722,059 A | 2/1998 | Campana | 455/226.2 |
| 5,722,064 A | 2/1998 | Campana | 455/351 |
| 5,729,600 A | 3/1998 | Blaha | 379/265 |
| 5,742,233 A | 4/1998 | Hoffman et al. | 340/573 |
| 5,793,861 A * | 8/1998 | Haigh | 257/693 |
| 5,815,565 A | 9/1998 | Doremus et al. | 379/265 |
| 5,825,283 A | 10/1998 | Camhi | 340/438 |
| 5,825,869 A | 10/1998 | Brooks et al. | 379/265 |
| 5,828,731 A | 10/1998 | Szlam et al. | 379/88 |
| 5,832,059 A | 11/1998 | Aldred et al. | 379/34 |
| 5,832,070 A | 11/1998 | Bloom et al. | 379/265 |
| 5,857,014 A | 1/1999 | Sumner et al. | 379/93.02 |
| 5,864,615 A | 1/1999 | Dezonno | 379/265 |
| 5,940,494 A | 8/1999 | Rafacz | 379/265 |
| 5,963,635 A | 10/1999 | Szlam et al. | 379/309 |
| RE36,416 E | 11/1999 | Szlam et al. | 379/88.09 |
| 5,991,394 A | 11/1999 | Dezonno et al. | 379/265 |
| 6,044,146 A | 3/2000 | Gisby et al. | 379/265 |
| 6,044,355 A | 3/2000 | Crockett et al. | 705/8 |
| 6,118,763 A | 9/2000 | Trumbull | 370/231 |
| 6,134,530 A | 10/2000 | Bunting et al. | 705/7 |
| 6,157,655 A | 12/2000 | Shtivelman | 370/412 |
| 6,269,153 B1 | 7/2001 | Carpenter et al. | 379/88.02 |
| 6,272,347 B1 | 8/2001 | Griffith et al. | 455/445 |
| 6,310,951 B1 * | 10/2001 | Wineberg et al. | 379/265.06 |
| 6,314,089 B1 | 11/2001 | Szlam et al. | 370/270 |
| 6,359,892 B1 | 3/2002 | Szlam | 370/401 |
| 6,359,982 B1 | 3/2002 | Foster et al. | 379/266.06 |
| 6,362,838 B1 | 3/2002 | Szlam et al. | 345/762 |
| 2002/0047859 A1 | 4/2002 | Szlam et al. | 345/705 |
| 2002/0067822 A1 | 6/2002 | Cohen et al. | 379/265.12 |
| 2002/0143878 A1 | 10/2002 | Birnbaum et al. | 709/205 |
| 2002/0145624 A1 | 10/2002 | Szlam et al. | 345/738 |
| 2002/0161896 A1 | 10/2002 | Wen et al. | 709/227 |

* cited by examiner

BLENDED AGENT CONTACT CENTER

TECHNICAL FIELD

This invention relates to voice processing and telephony, and more particularly, to a contact center technology which provides more flexible use of agents among a variety of multimedia interactions with customers.

BACKGROUND OF THE INVENTION

Call centers of widely varying sizes and technologies have become prevalent over the past several years. A call center can range from two or three agents to several hundred agents or even larger. Typical examples of call centers might be a credit card company which is staffed with several hundred agents to handle customer calls, an airline reservation center, etc. A "contact" center is defined herein as a call center except that agent customer interaction is not limited to telephone calls. Rather, agents and customers may interact with each other via e-mail, web chat, or any other media.

Most contact centers include a variety of functions which are well known to those of skill in the art. For example, a contact center may include an integrated voice response (IVR) system, whereby a user may interface with a computer and enter tones and commands to send and receive information. An additional feature which may be implemented in the contact center is a fax on demand (FOD) service. An FOD service is an arrangement whereby a user may telephone into the system and specify through entered digits a particular document and a fax number at which the customer is available. The system will then fax the specified document to the customer. Other exemplary features and functions available in contact centers of the present day include predictive dialing capabilities, outbound calling applications, reporting capabilities, voice mail services, etc.

The contact center is typically staffed with numerous agents, each of which has an associated terminal for voice and data. The agents may be required to interact with customers in particular contact center applications. For example, some agents may interact with callers in order for the agent to handle inbound callers with account questions, while other agents may be required to interact with callers for the purpose of explaining to the customer a new promotion after the customer was contacted via an outbound call. Other potential forms of agent customer interaction could occur by video conferencing, email, web chat, or any other manner that may facilitate or require the agent and the customer to interact.

FIG. 1 shows an exemplary prior art contact center system. The ethernet 106 is utilized to connect a mainframe computer 103 to other peripherals as shown. Agents 109–111 communicate with the PBX 115. Additionally, agents communicate with a predictive dialer 117 for outbound calling, and with a variety of other peripherals as shown. Reporting capabilities are implemented separately for inbound and outbound calls at 104 and 105, respectively, as previously alluded to.

One problem with most modern day contact center equipment is that most or all of the foregoing services are implemented by different vendors, using different hardware and other proprietary technology. Interfacing between these systems is often difficult and cumbersome. For example, contact centers often have different reporting systems for inbound and outbound calls. If, during the course of a reporting period, an agent was involved in both inbound and outbound calling, then two separate reports will be generated for that agent. Any statistics that involve both reports are often arrived at manually, by reviewing both reports. Even if the process is automated, there is no way to generate real time reports for different service types, because there is no centralized reporting capability with real time and continuous access to all relevant data for all different service types. Moreover, since the different service types are all running independently, using different standards and equipment, real time reporting is virtually impossible.

Another drawback of prior art contact center arrangements is that agent terminals are typically configured and allocated for one type of customer agent interaction. For example, an agent terminal may configured to handle only inbound calls, and would be staffed with an agent trained to do the same. Another agent terminal, built and configured by a different vendor, may be limited to outbound calling, and staffed with an agent that is familiar with the one outbound application running at the contact center. For example, in a conventional outbound calling application, the predictive dialer sets up the outbound calls and assigns agents from a pool of those associated with outbound calling applications. Moreover, the outbound application would have no knowledge of, nor any control over, the agents assigned to other contact center functions such as inbound calling. Additionally, agents assigned to handle inbound calls are consolidated into a pool and utilized by the inbound calling applications to allocate the particular incoming calls. The system function of allocating the agents to the incoming calls typically has no knowledge of the agents assigned to outbound calls. Each list of agents is kept in a separate queue, and each is of no use to the other.

The foregoing system architecture is inefficient for the reason that resources available to handle one type of call may not be utilized to handle the other. Thus, during a time of heavy incoming call volume, some outbound agents might be idle while all of the inbound agents are busy and inbound calls are thus being blocked or left on hold for extended periods of time. It would be desirable if one could shift the outbound agents to handle inbound calls and vice versa. Additionally, even if all outbound agents are busy, outbound calling may be less of a priority than inbound calling. Thus, the system resources are sacrificing higher priority tasks to do lower priority tasks.

In some prior systems, an administrator may recognize that the service threshold level for inbound calls is being exceeded, and that callers are therefore left on hold for too long. In such systems, if the inbound calling is overloaded, and calls begin to be blocked, a particular agent may be logged out of a outbound calling application and reallocated to an inbound call application.

One problem with this attempted solution is that system performance must first degrade before a change is made. Moreover, an agent has to be logged out of one application and into another, which also may take some time. The system is not dynamic and does not allow for transparent and full blending. Moreover, if the level of system performance for inbound calls degrades, unless it passes a threshold, outbound calling agents (or agents configured for any other type of customer agent interaction) will not be reallocated to handle inbound calls. This means that an inbound caller may be on hold, while there is an idle agent assigned to some other form of agent customer interaction, yet the two will not be connected simply because the inbound caller has not been on hold long for the system to conclude that performance is lower than the threshold. Moreover, because of the extensive effort required to log the agent out of one application and into another, the caller may hang up before the system can correct the problem.

Yet another problem with such existing technology is that a substantially zero wait time for inbound calls is not possible. This is because to achieve such a substantially zero wait time, agents would have to be idle in order to be available for immediate allocation to an incoming call. There is no way to automatically and immediately begin handling one type of call upon completion of another type of call, all in real time.

There is no ability to dynamically and flexibly allocate agents to different contact center applications, to prevent system degradation. There is no technique to keep the agents logged into different applications and to allocate the agents immediately, as needed, to different applications.

In view of the foregoing, there exists a need in the art for a truly blended and more flexible contact center solution which provides more efficient utilization of the time of all agents.

There is also a need in the art for a contact center that can handle a variety of agent customer interactions (e.g. e-mail, web chat, video conferencing, etc.) while flexibly and dynamically allocating agents from a large single agent pool to handle any type of desired agent customer interaction.

SUMMARY OF THE INVENTION

The above and other problems of the prior art are overcome and a technical advance is achieved in accordance with the present invention which relates to a truly blended contact center environment. In accordance with the present invention, one or more agents are always available to perform any of a variety of agent customer interaction, and the agents are allocated dynamically based upon system load. For purposes of explanation herein, we use inbound calling and outbound calling applications as but two examples. It is understood however, that the invention is not limited to inbound and outbound applications, but encompasses other forms of agent customer interaction, such as web chat, e-mail, etc.

In the preferred embodiment, the system manager/supervisory function permits the designation of various agents as desired. This designation may include a centralized list of agents along with a profile for each agent. The profile defines different service types that the agent can implement. The profile represents which types of contacts (e.g. inbound calling, web chat, outbound calling, etc.) that a particular agent may be assigned.

In operation, when an inbound call is received, the system checks the available agents and allocates the call to one of those agents. The agent may be selected from all agents whose profile includes the ability to handle inbound calls. Importantly, agents are not required to reconfigure anything prior to handling a different type of agent customer interaction. Rather, agents stay continuously logged into multiple applications at the same time, and handle whatever type of contact or call is assigned by the supervisory functions of the network.

In other embodiments, an agent profile may provide the capability to process multiple contacts simultaneously, or may include the ability to interrupt one type of contact by putting it on hold to process another type of contact.

Agents may be notified just prior to being assigned a call, with the notification including an identifier of the type of call being assigned to them.

DETAILED DESCRIPTION OF THE PREFERRED EMBODIMENT

Figure 1:
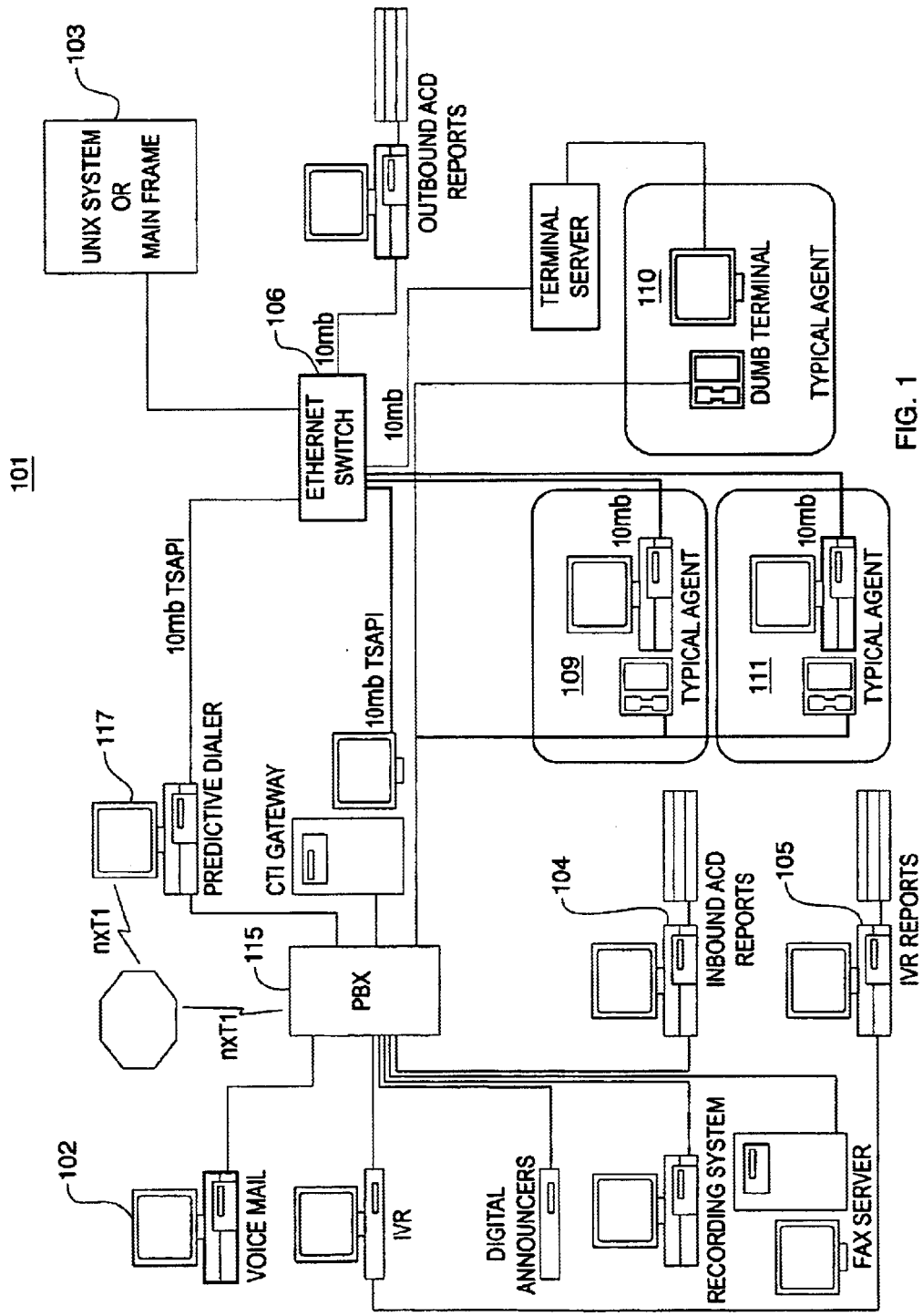
FIG. 1 is an exemplary prior art contact center arrangement.
Figure 2:
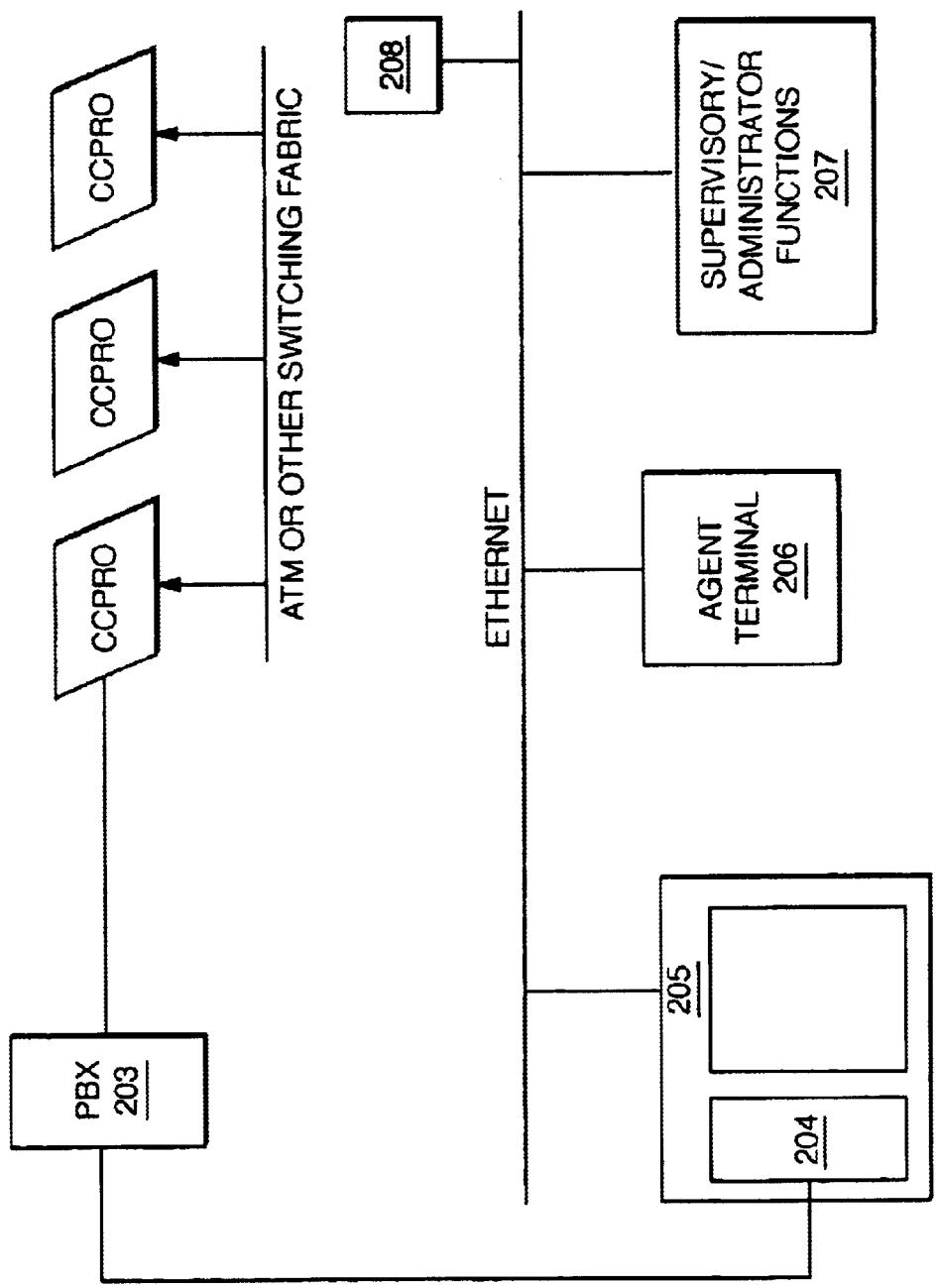
FIG. 2 depicts an exemplary contact center system that can implement the present invention.

Recently, a product has been introduced into the market which consolidates virtually all contact center processing functionality into a set of one or more servers. The novel architecture is shown in block diagram form in FIG. 2. The contact center 201 includes a network 215 interconnecting a plurality of agents 205–207, an optional legacy PBX 203, and supervisory and administrative functions 207 and 208. The contact center functionality such as voice mail, predictive dialing, etc., can all be implemented on a set of one or more NT servers, the software for which is presently sold under the name CC PRO and is available by contacting the Assignee of the present application.

The CC PRO servers are expandable and preferably linked through a relatively high bandwidth network such as an ATM switch, or other switching system. Importantly, the communications bandwidth required for interaction between the CC PRO NT servers is not implemented by utilizing the switching bandwidth of the CC PRO switches themselves. This provides a linearly expandable system in that doubling the number of CC PRO NT servers will double the switching capacity of the contact center. This linear expandability, and linking of CC PRO switches in this manner, is itself the subject of another patent application owned by the Assignee of the present invention.

The supervisory and administrative function 207 and 208 are utilized to define the profile associated with each of the agents. For each such agent, there exists a logical profile record, which indicates the types of contact services (e.g. inbound calling, outbound calling, etc.) that the particular agent can handle. Some of the different services may be capable of being done together. For example, an agent that is performing a web chat may be able to also handle an outbound call while the customer for the web chat contact is busy reading and responding to a message. Thus, the profile for an agent would include not only an indicator of which services an agent may handle, but also, which services may be utilized together. Other parameters of the service profiles may include preferences, etc.

It is possible that an agent profile would include only one type of service, for example, outbound calling. This would be the equivalent of an outbound agent, similar to the way present day systems include agents that can only do outbound calling. The particular profile designated for any agent may reflect any variety of factors that the call center operator deems appropriate.

Figure 3:
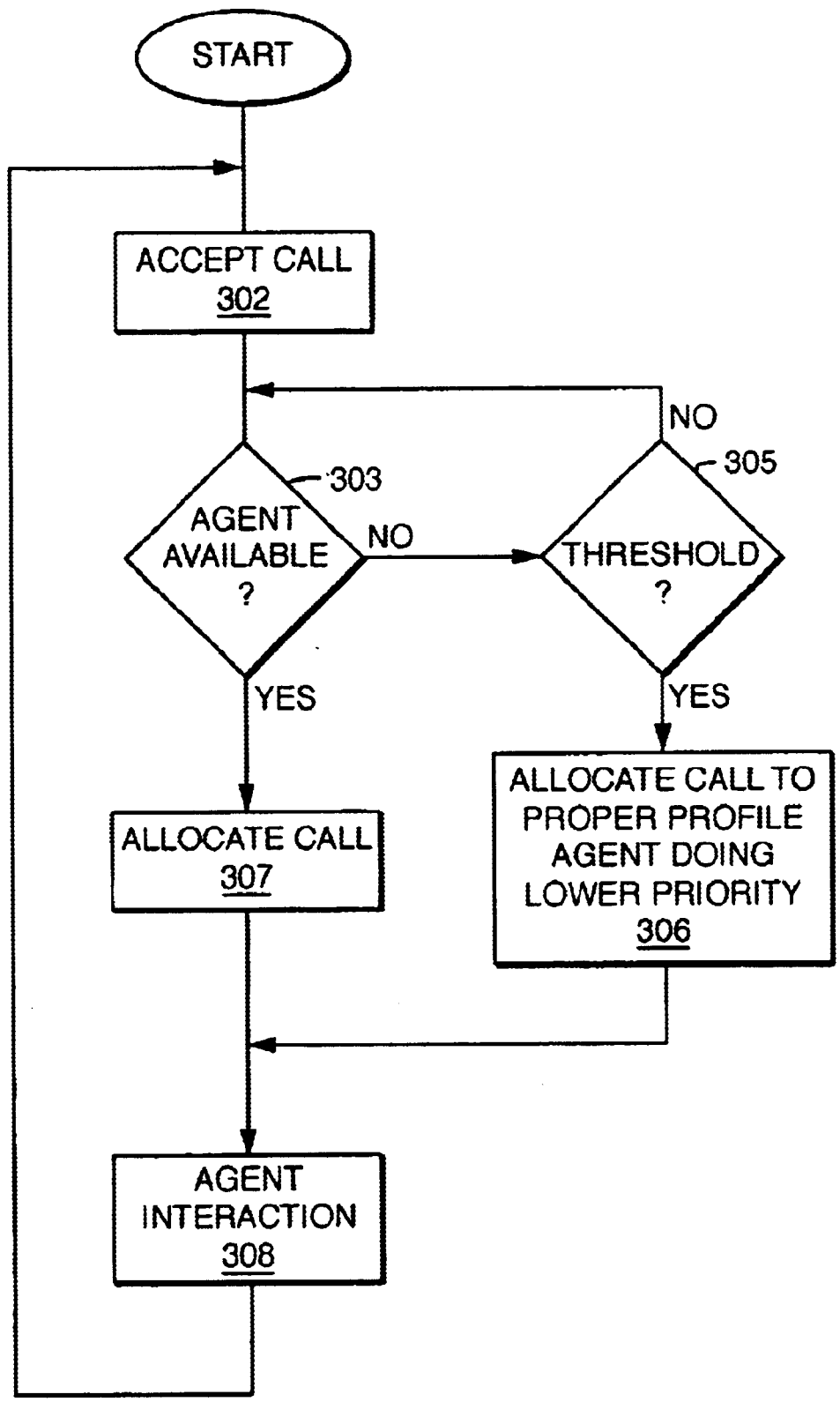
FIG. 3 is a functional flow diagram of the allocation of a call in the present system.

FIG. 3 shows a flow chart of one exemplary embodiment of the functional aspects of the present invention. The flow chart is entered at start 301 and an inbound call is accepted at block 302. The CC PRO servers 202 determine whether an agent is available for the call at decision block 303. If so, the call is allocated and processed by the agent at blocks 307 and 308 and is terminated in a typical fashion.

If, on the other hand, no agent is available that has the capability to handle an incoming call, then the system keeps track of the call on hold and assigns it as soon as possible to the next available agent that is handling incoming calls and which becomes available. As long as this occurs prior to the threshold level being exceeded at decision point 305, the call will be allocated in the same manner as previously described. However, if the call is on hold too long, then control will be transferred to operational block 306 as shown.

At block 306, the next available agent that has a profile which includes the ability to handle incoming calls is allocated to handle that call. Thus, the call may be handled by an agent that is just completing an outbound call or other customer contact. As long as the agent is one that is designated as capable of handling an inbound call, it makes no difference to the system what type of service the agent has just been providing. There is no procedure to log off or log on to different applications, and each agent is always available to handle calls requiring different applications, as long as the agent is not busy.

In still another embodiment, the foregoing "two step" process may be compressed into one step. Specifically, the arrangement of FIG. 3 describes a system wherein the caller is first left on hold until an agent is available whose profile includes inbound calling finishes an inbound call which that agent is handling. If no such agent becomes available, then the threshold is exceeded and an agent whose profile includes inbound calling but who is presently handling an outbound or other type of call is assigned to the call. Thus, the system is "two step" in that it has a preference for assigning to inbound calls other agents that are already handling inbound calls. Only if one of those is not available by the time the threshold is exceeded is an agent assigned whose profile shows inbound call capability but who is handling another type of customer interaction assigned.

As an alternative, a system which provides for a substantially zero wait time can be implemented by setting the threshold 305 decision block to zero. More particularly, consider a plurality of agents operating on both inbound and outbound calls. When a new call arrives, the next available agent with the proper profile capabilities is assigned the call, irrespective of what type of activity that agent is engaged in when the new call arrives. Thus, if there is a large number of agents, it is highly likely that one will become available extremely frequently, and the call will experience substantially zero wait time. The call is allocated in one step, rather than first waiting to see if an agent performing inbound calls is available and then, upon the threshold being exceeded, allocating the call to an agent doing outbound calling or other functions but nonetheless capable of handling inbound calls.

In still another embodiment, the call may be left on hold until the threshold is approached. At that time, the next available agent with the appropriate capabilities is assigned the call. At the time the call is allocated, the system makes no distinction between agents that have been handling inbound calls and agents that have been handling outbound calls, or any other type of agent customer contact. As long as the agent can handle inbound calls and becomes available, it is an appropriate and equal candidate for the call.

There is an important consequence of the last of the foregoing techniques. For purposes of simplicity and explanation, consider the example of only the inbound and outbound calling If the aforementioned allocation technique is utilized, each time the threshold is exceeded (i.e. an incoming caller is on hold too long), the system will allocate the next available agent to handle the incoming call. Since all agents can do both incoming and outbound calls, as the incoming call volume increases, the system will be forced to assign more of more of the agents to incoming calls and less and less of the agents to the outbound calls. Thus, inherently, without any separate steps, the call center statistics with respect to the number of agents handling each type of agent customer interaction will tend to follow calling patterns. If the number of inbound calls ramps up or down, so too will the number of agents processing such calls.

The technique eliminates the prior art problem of having to first detect a degradation in system performance and then reassign certain agents to be reserved for a different type of call. Instead, the system will statistically tend toward the way it should, increasing its capacity with respect to whatever type of contacts are needed, and decreasing that capacity automatically as required. If the threshold level (i.e. maximum call on hold time) were increased, then less agents would wind up being assigned to handle incoming calls. Thus, increase in the threshold level will make the system tend toward having more outbound calling.

The foregoing explanation is equally applicable to other types of agent customer interaction, such as email, web chat, etc. In the most flexible case, each agent can do everything, and a call is allocated to the first available agent that can perform the proper service. If too many high priority services are needed (e.g. inbound calls) then less agents will be doing lower priority (i.e. outbound calling) services.

Due to the increased flexibility of the agents, particular contact center traffic patterns may cause one or more agents to change the type of agent customer interaction in which they are involved on a frequent basis. It is therefore beneficial to have the service type announced to the agent in advance. Thus, the system may provide an audio or video prompt just prior to a call being connected, in order that the agent is made aware of the particular type of call being transferred.

Figure 4:
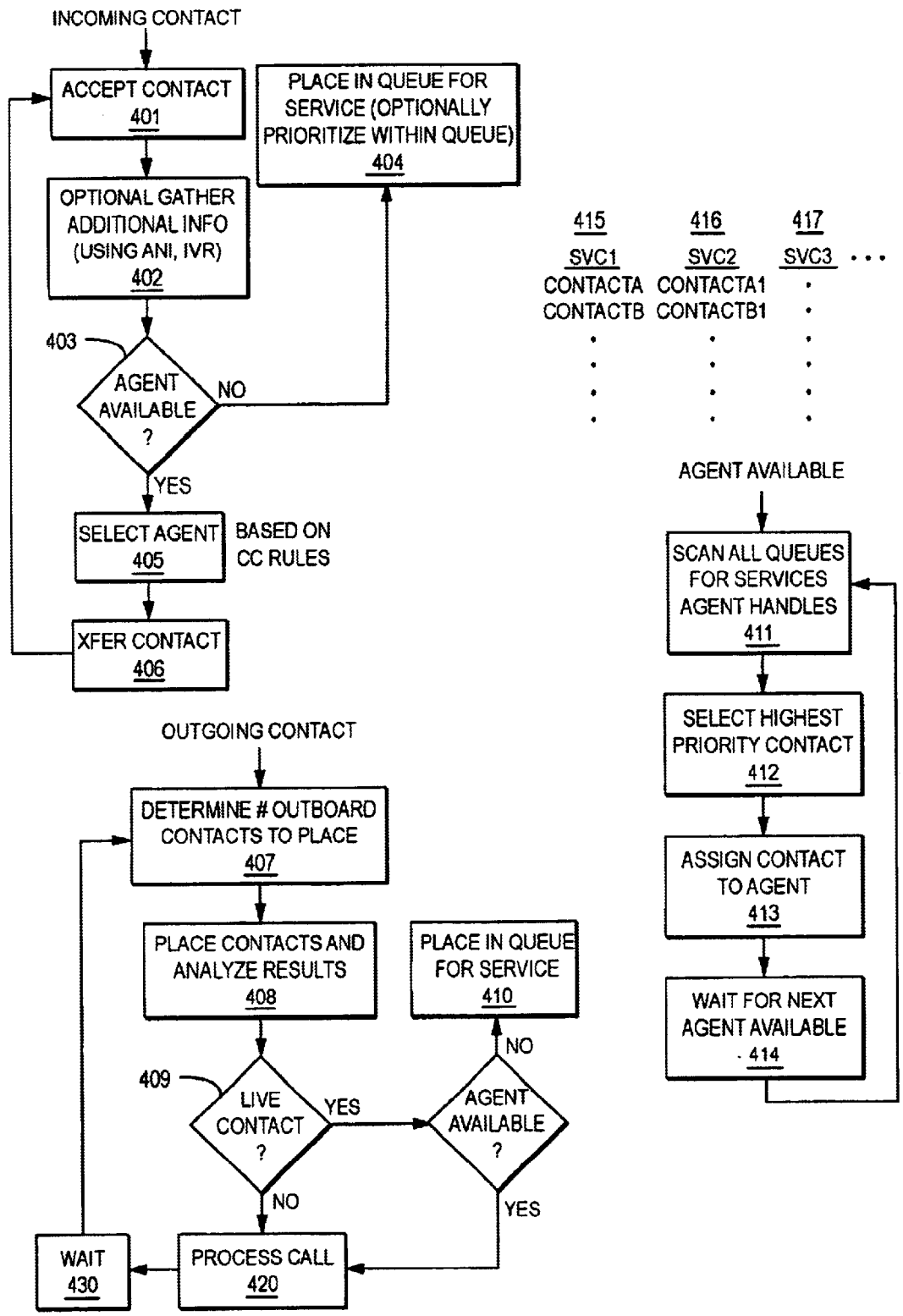
FIG. 4 is an alternative flow diagram representing an additional embodiment of the invention.

FIG. 4 represents a flow diagram for a slightly more sophisticated embodiment of the present invention. FIG. 4 represent inbound and outbound contacts of any type, along with an algorithm for allocating such contacts from several different queues to an agent for processing 415–417.

With respect to incoming contacts, they are accepted at block 401 and preprocessed and block 402. The preprocessing may involve optional extraction of ANI data, or entry of account information using a voice response system. The preprocessing may also ascertain certain other information related to the call, including type of inquiry, etc.

If an agent is available at block 403, the call is simply allocated and processed at blocks 405 and 406. If not, the call is placed within the appropriate queue for processing at 404. The particular queue into which the call is placed is determined by characteristics and requirements of the call. For example, in a credit card company call center, each of queues 415–417 may represent a different spending level, and the queues may have different average wait times for servicing. Alternatively, the queues may represent different languages that callers speak. The different queues may also correspond to different service types, such as email, web chat, etc. Other combinations and possibilities may be utilized as well, depending upon the particular needs of the call center.

Moreover, while the different queues 415–417 may have different priorities, the contacts placed within the queues may be prioritized themselves. Accordingly, it is possible to have a relatively high priority contact in a low priority queue that has higher priority than a low priority queue in a higher priority queue. In general, contacts in all the queues may be assigned priority levels based upon a combination of the particular queue that the contact is in as well as its position or designation within that queue.

With respect to outgoing contacts, the number of outbound contacts to place is ascertained at block 407. The algorithm for determining how many outbound contacts to make may factor in such items as maximum wait time, average wait time, service levels, average number of contacts in the queue, number of queues, guaranteed number of agents available for certain types of contacts, etc. Nonetheless, the system may have any of a variety of techniques for deciding how many outbound contacts should be initiated at 407. Predictive dialing algorithms may be employed.

At block 408, the contacts are analyzed to determine if there is a live contact. This corresponds to determining if a called party has answered the telephone. If a called party answers, then the contact is preferably immediately processed by an available agent as shown in FIG. 4. Note that the process call block 420 would process the call in a different manner depending upon whether or not there is a live contact.

If there is no live individual that answers the outbound contact, the contact is placed into a queue and serviced in accordance with the algorithm described below, which allocates agents to contacts waiting to be processed. It is noted that the outbound calling target time is usually very close to zero, since as a practical matter, it would usually make little sense to initiate an outbound contact and then keep the party on hold after they answer.

The agent allocation flow diagram is described at 411–414. When an agent becomes available at 411, the agents profile is read and a determination is made as to the contacts that the particular agent can process. At 412, the queues are examined with the agent profile to ascertain the highest priority contact that the agent can process. This contact may be a low priority contact that has been waiting in the queue for much longer than the prescribed wait time. It may be a very high priority contact that is forbidden by system rules from ever exceeding its target wait time. Whatever the criteria for the determination, block 412 will ascertain the highest priority contact that the available agent can process.

At 413, the contact is assigned to that agent, and the system then waits for the next available agent at 414. Upon such availability, the system returns to block 411. It is also noted that the queues may contain contacts of varying types, and that contacts of the same type may be in varying queues.

Like the previous embodiments, the foregoing arrangement will also tend to allocate contacts in a manner such that resources are diverted toward the contacts that need them most. By assigning each available agent the highest priority contact that it can handle, the agents are utilized in a manner that maximizes the efficiency of the system. As more and more higher priority contacts are taking place, more agents will be automatically allocated to be processing the higher priority contacts.

The foregoing describes the preferred embodiment of the present invention. It is understood that the invention is not limited to the foregoing, but encompass all of the modifications and additions that are apparent to those of skill in this art and which are covered by the following claims.

What is claimed:

1. A contact center for processing agent customer interactions, said contact center comprising:

a plurality of agent terminals, at least a subset of said plurality of agent terminals designated and configured to accomplish a specified at least one of at least two types of customer interactions at any given time, said at least a subset of said plurality of agent terminals having a first number of assigned agent terminals;

means for maintaining a profile record for each agent terminal, the profile record for each terminal being indicative of which of said specified at least one of said at least two types of agent customer interaction each said agent terminal is capable of accomplishing at any given time;

a processor, for automatically allocating agent customer interactions to an agent terminal; and a switching arrangement, responsive to said processor and to said means for maintaining a profile record for each agent terminal, for automatically increasing said first number of assigned agent terminals of the subset of agent terminals, and for allocating at least one agent customer interaction to a next available agent at an agent terminal which is part of the increased number of agent terminals in said subset of agent terminals whose profile indicates an ability to accomplish the type of agent customer interaction to be allocated when a predetermined contact center performance threshold is exceeded, thereby precluding degradation of performance of the contact center.

2. A method of processing inbound and outbound calls in a contact center comprising the acts of:

causing a plurality of agent terminals to be logged on to both inbound and outbound contact center software applications;

processing inbound calls with a subset of said agent terminals unless and until a predetermined performance threshold is approached; and automatically increasing the number of said agent terminals in said subset if said predetermined performance threshold is approached too closely, thereby precluding degradation of performance of the contact center.

3. The method of claim 2 wherein said number is automatically increased by reassigning the first available agent terminal processing an outbound call to process an inbound call.

4. The contact center according to claim 1, further including a supervisory terminal which includes software for altering the profile record for each agent terminal.

5. The method according to claim 2, further comprising the acts of:

associating a profile that indicates which types of agent customer interaction the agent terminal can process; and altering the profile that indicates which types of agent customer interaction the agent terminal can facilitate using a supervisory terminal.

\* \* \* \* \*